United States Patent [19]

Komatsu et al.

[11] Patent Number: 4,811,179
[45] Date of Patent: Mar. 7, 1989

[54] DISPLAY DEVICE

[75] Inventors: Haruo Komatsu; Atsushi Yamada, both of Shizuoka, Japan

[73] Assignee: Koito Manufacturing Co., Ltd., Tokyo, Japan

[21] Appl. No.: 43,516

[22] Filed: Apr. 28, 1987

[30] Foreign Application Priority Data

| Apr. 28, 1986 | [JP] | Japan | 61-64816[U] |
| Oct. 28, 1986 | [JP] | Japan | 61-254675 |
| Jan. 12, 1987 | [JP] | Japan | 62-3286 |
| Jan. 14, 1987 | [JP] | Japan | 62-2863[U] |
| Apr. 10, 1987 | [JP] | Japan | 62-86996 |

[51] Int. Cl.$^4$ .................... F21M 3/14; H01H 9/00
[52] U.S. Cl. ..................... 362/256; 362/279; 362/273; 200/315
[58] Field of Search ........... 362/255, 256, 290, 279, 362/325, 293; 200/311, 313, 315; 40/546, 547, 576

[56] References Cited

U.S. PATENT DOCUMENTS

| 2,398,799 | 4/1946 | Miller | 362/290 |
| 2,699,536 | 1/1955 | Roth et al. | 362/293 |
| 3,006,019 | 10/1961 | Deaton | 362/290 |
| 3,543,235 | 11/1970 | Eikenberry et al. | 340/107 |
| 3,727,041 | 4/1973 | Scott | 362/29 |
| 3,794,800 | 2/1974 | Bodge | 200/315 |
| 3,863,251 | 1/1975 | Gould et al. | 340/107 |
| 4,044,708 | 8/1977 | Klein | 362/29 |
| 4,074,252 | 2/1978 | Keller | 340/107 |
| 4,366,407 | 12/1982 | Walsh | 362/255 |
| 4,535,396 | 8/1985 | Guthrie | 40/547 |
| 4,583,151 | 4/1986 | Nagel | 362/29 |
| 4,630,181 | 12/1986 | Fain et al. | 362/235 |
| 4,688,156 | 8/1987 | Suzuki et al. | 362/29 |

FOREIGN PATENT DOCUMENTS 1954620 5/1971 Fed. Rep. of Germany ........ 362/61

Primary Examiner—David A. Okonsky
Attorney, Agent, or Firm—Sughrue, Mion, Zinn, Macpeak & Seas

[57] ABSTRACT

A display device which comprises a case in which a light source is accommodated, color changing means by which the color of light from the light source is changed to a predetermined color of illumination, a display panel that is formed of a light-transmitting material to cover the front opening of the case and which is provided with a light-shielding film in areas other than those corresponding to a display portion, and color display controller that is disposed on the display panel and which controls the color of illuminating light that issues from the light source and is transmitted through the display portion. The color display controller is composed of a plurality of thin strips that have a color different from that of illumination provided by the color changing means and which are spaced from each other. The light source is disposed behind the strips, with the color provided by the color changing means being displayed when the light issuing from the light source has passed between the strips, while a composite of the color provided by the color changing means and the color of the strips is displayed when the light issuing from the light source has been reflected from the strips.

12 Claims, 9 Drawing Sheets

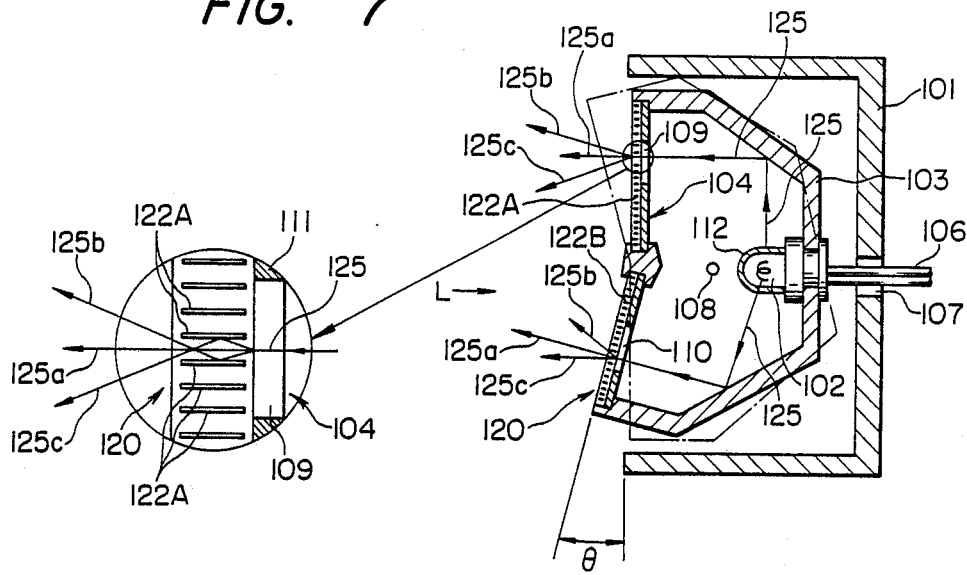
FIG. 7
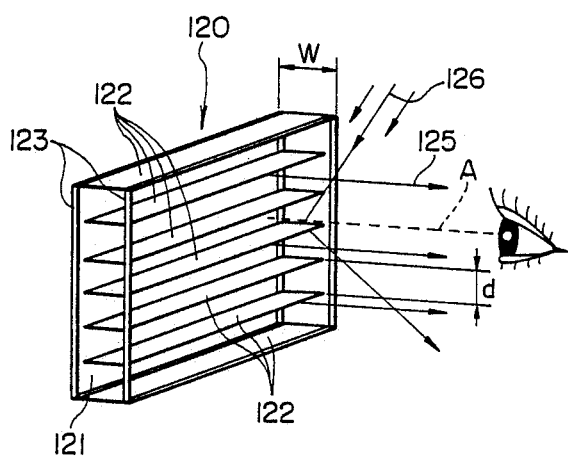
FIG. 8
FIG. 9

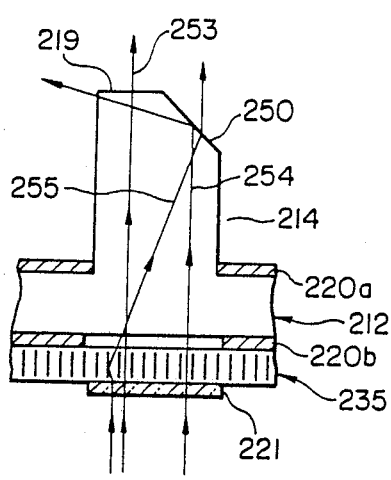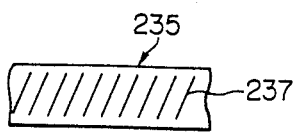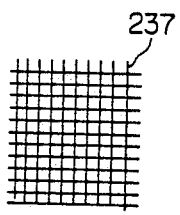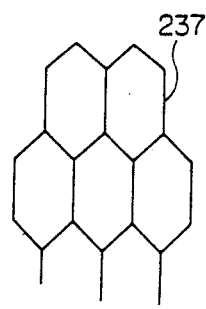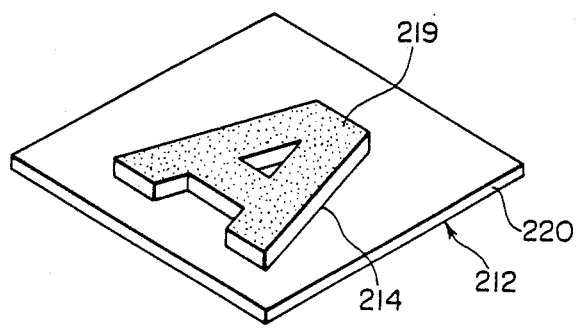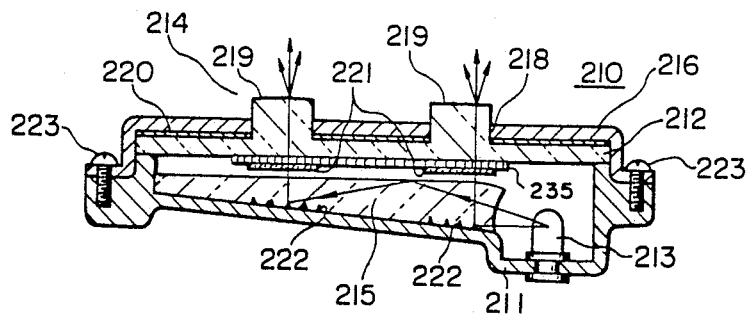

DISPLAY DEVICE

BACKGROUND OF THE INVENTION

The present invention relates to a display device that is advantageously used as an automobile indicator lamp and in other applications. More specifically, the present invention relates to an improved display device that allows its display portion to be illuminated with light of varying colors.

A prior art display device that allows the display portion of a display panel to be illuminated with light from a light source is shown in FIG. 1. This display device, generally indicated at 1, is used as an automobile indicator lamp. Its basic components are a light source 2, a case 3 for accommodating the light source 2, and an optically translucent (light-transmitting) display panel 4 that closes the front opening of the case 3. A light-shielding film 6 is formed on the entire surface of the back side of the display panel 4 except for the area corresponding to display portion 5. One application of this display device is its use as an oil indicator; if the residual amount of oil falls below a given level, the light source 2 is lit and illuminates the display portion 5 to inform the driver of the fact that the oil will run out soon. In this type of display device, the quantity of light that is transmitted through the display portion is always constant. However, the ambient brightness differs considerably between daytime and nighttime and the driver wants different colors of illumination to be provided as necessity arises.

In order to meet this demand, it is desirable that the illumination for daytime has a red or orange color whose visibility sensitivity is high enough to allow the driver to easily confirm the lighting of the lamp while in nighttime the color of illumination is changed to yellow or yellow green which causes less glare because of its low visibility sensitivity. Conventionally, this is achieved by selective use of two light sources that are covered with bulb filters 7 having different colors. However, this method is costly since it requires two light sources and associated components such as a circuit for switching from one light source to the other. In addition, the system employing this method requires complicated electrical wiring and has great potential for suffering a lot of problems.

SUMMARY OF THE INVENTION

An object, therefore, of the present invention is to provide a display device that has solved the aforementioned problems of the prior art. The display device of the present invention comprises a case in which a light source is accommodated, color changing means by which the color of light from the light source is changed to a predetermined color of illumination, a display panel that is formed of a light-transmitting material to cover the front opening of said case and which is provided with a light-shielding film in areas other than those corresponding to a display portion, and a color display controller that is disposed on said display panel and which controls the color of illuminating light that issues from said light source and is transmitted through the display portion, said color display controller being composed of a plurality of thin strips that have a color different from that of illumination provided by said color changing means and which are spaced from each other, said light source being disposed behind said strips, with the color provided by said color changing means being displayed when the light issuing from said light source has passed between said strips while a composite of the color provided by said color changing means and the color of said strips being displayed when the light issuing from said light source has been reflected from said strips.

BRIEF DESCRIPTION OF THE DRAWINGS

FIG. 7 is a cross-sectional view of a display device according to a first embodiment of the present invention in which it is incorporated in an internal illumination type switch device;

FIG. 8 is a sketch of the color display controller used in the embodiment of FIG. 7;

FIG. 9 is a cross-sectional view of a modification of the area around the display portion of the device of the present invention;

FIG. 18 is a partial cross-sectional view showing the essential parts of a display device according to a fifth embodiment of the present invention;

FIGS. 19(a), (b) and (c) show three modifications of the strips used in the device of FIG. 18;

FIG. 20 is a perspective view of an example of the "three-dimensional effect" display panel that may be used in the embodiments of FIGS. 16 and 18;

FIG. 21 is a cross-sectional view of a display device that is suitable for incorporating the systems of FIGS. 16 and 18;

DETAILED DESCRIPTION OF THE PREFERRED EMBODIMENTS

Figure 1:
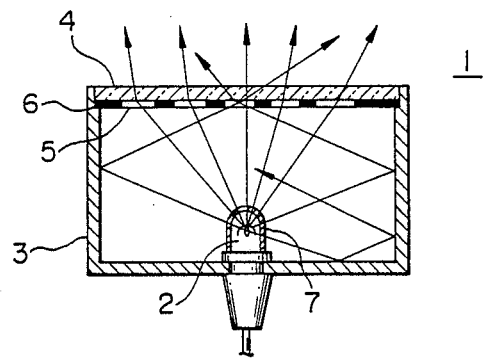
FIG. 1 is a cross-sectional view of a prior art display device.

The concept of the change of color of illumination provided by the display device of the present invention is hereunder described with reference to FIGS. 2(a) and (b), in which the device is generally indicated at 30. A light source 2 is optionally covered with a bulb filter 7 to provide light of a certain color, e.g., red. In front of the light source, a display portion 5 provided with white-color printing or the like is provided for permitting light transmission to form a displayed image. A light-shielding portion 6 is formed as a continuous part of the display portion. In front of the display portion are provided a plurality of strips 19 or louvers which are vertically spaced from each other to be positioned parallel to the optical axis L. Each of the louvers is colored and integrally mounted in a case 3 produced by resin molding. The louvers serve as means 13 for controlling the color of illumination and can be tilted en masse with the case 3.

Figure 2A:
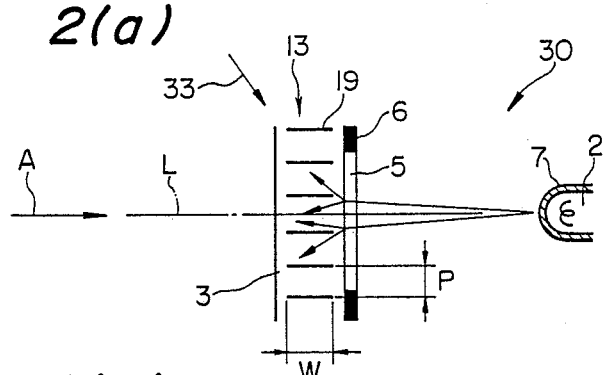
FIGS. 2(a) and (b) show the concept of the change in the color of illumination that is attained by one aspect of the present invention.
Figure 3:
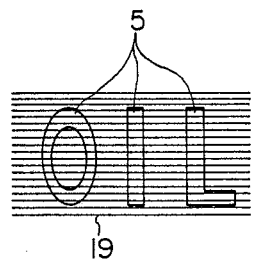
FIG. 3 illustrates the state of display on the display portion.

If the display device 30 is positioned as shown in FIG. 2(a), the direction of the line of vision A is substantially parallel to the optical axis L, or the strips 19 serving as an illumination color controller 13 are parallel to the direction of the line of vision A, light from the light source 2 will not be reflected by any of the louvers 19 and the viewer can directly recognize the color of illumination provided by the light source. Since this illumination has the red color imparted by the bulb filter 7, one can readily confirm, even in daytime, that the light has lit up. The state of display portion 5 when the light has lit up is shown in FIG. 3, in which the strips 19 are visible as fine lines of a certain color, e.g., yellow or green yellow.

Figure 2B:
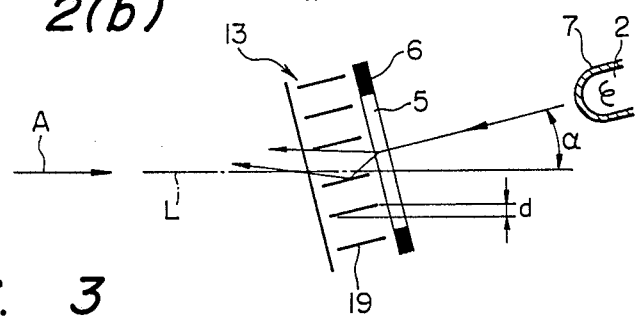

If the display device 30 is inclined, as shown in FIG. 2(b), at an angle u with respect to the direction of the line of vision A, a part of the light from the light source 2 is reflected by the surfaces of the louvers and its color is mixed with the color of the louvers to produce a composite color which, when viewed in the direction of the line of vision A, is recognized to be different from the color attained in the case of FIG. 2(a). Therefore, in nighttime, the display device 30 will create a color whose visibility sensitivity is low enough to cause minimal glare.

The mechanism behind this phenomenon is explained more specifically below. Light from the light source 2 assumes a red color after passage through the bulb filter 7. The light then diffuses through the display portion 5 that is formed by a suitable method such as printing in white color. Part of the diffused light will be reflected by the surfaces of the strips 19 that are inclined as shown in FIG. 2(b). The light emerging from the color controller 13 has undergone a certain change in color as a result of it having been reflected by the colored strips 19. The remainder of light that has not encountered the strips 19 and which has passed through the controller 13 straightforwardly will retain the color of illumination provided by the filter 7. As a consequence, the light emerging from the display device 30 has a composite color which is a mixture of the unaffected color of illumination imparted by the filter 7 and the color of illumination that has been affected by the color of the strips 19. In the case under discussion, the filter 7 has a red color and the strips 19 are yellow, so that the resulting composite illumination has a weak orange color that will not cause much glare to the viewer.

The degree of change in the color of illumination is determined by the angle of pivoting, $\alpha$, of the display device 30, the width W of each strip 19 and the pitch P of such strips [see FIG. 2(a)]. These parameters may be set for their own optimum values in consideration of such factors as the flickering of display portion 5 and the proportions of colors mixed in the finally obtained illumination.

Any ambient light 33 that falls upon the device 30 at a large angle of incidence with respect to the optical axis L will be effectively blocked by the strips 9 and will not enter the case 3, with a resulting improvement in the contrast imparted to the internal display and, hence, in the visibility of the display attained when the light has lit up. In addition, the display device of the present invention which attains a change in the color of illumination by mechanical means is advantageous over the prior art technique relying on the selective use of two light sources in that it does not require any switching circuit or wiring cords which often experience open-circuit problems or other troubles.

The strips 19 may be made of semi-transparent materials if one wants to achieve a greater change in the color of illumination. In any event, the choice of the transmittance of the strips 19 may be made in consideration of the change in illumination the user wants.

The display device of the present invention is also characterized by its ability to control the quantity of light by mechanical means. In the case of FIG. 2(b), the line width, d, of an individual strip 19 is increased as compared with the case shown in FIG. 2(a) and a reduced quantity of light will pass between adjacent strips 19 to produce a less bright display portion 5 than when it is viewed in daytime. As a result, a minimum amount of glare will be caused to the driver.

The degree of light attenuation by the controller 13 is determined by the angle of pivoting, $\alpha$, of the display device 30, the width W of each strip 19 and the pitch P of such strips [see FIG. 2(a)]. Optimum values of these parameters may be determined in consideration of the flickering of display portion 5.

Figure 4A:
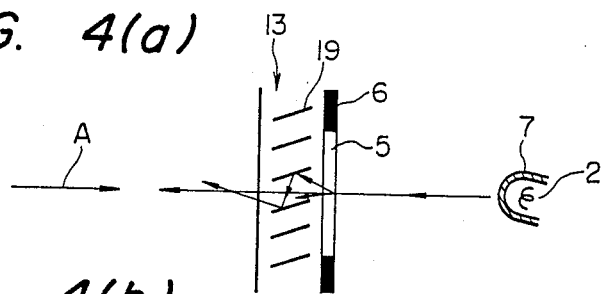
FIGS. 4(a) and (b) show the concept of the change in the color of illumination that is attained by another aspect of the present invention.
Figure 4B:
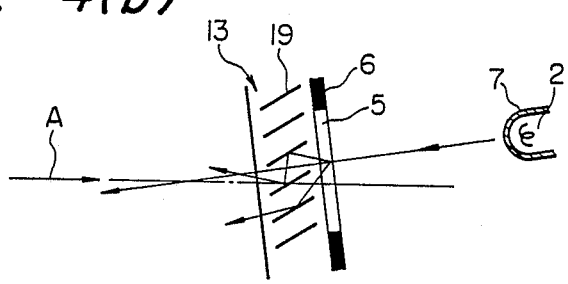

The foregoing description of the operating principle of the present invention assumes the situation in which the strips 19 are arranged parallel to each other in a vertical direction and are disposed at right angles with respect to the display panel 5, with the case being pivotally mounted to move like a see-saw. It should, however, be noted that this is not the only method of implementing the concept of the present invention; the strips may be arranged in any direction; the case 3 may be adapted to pivot or rotate in any direction depending upon the direction in which the strips 19 are arranged; and the strips 19 may be arranged in a checkerboard pattern or in a honeycomb configuration, rather than being oriented in a single direction. For instance, in FIGS. 4(a) and (b), the louvers 19 are not disposed at right angles with respect to the display panel 5 but are inclined to the optical axis L of the display device. The other aspects of this embodiment are identical to the case illustrated in FIGS. 2(a) and (b). The embodiment of FIGS. 4(a) and (b) has the advantage that rotating the display device by a small angle will cause a great change in the color of illumination. This embodiment is also effective for the purpose of selectively illuminating symmetrically arranged display panels with a single light source. In this case, more than one line of vision A exists and selective illumination can be achieved effectively if the louvers 19 are arranged at an appropriate angle with respect to the optical axis L that is determined by the positions of the individual display panels.

The basic mechanical structure of the display device that is capable of realizing the concept shown in the foregoing pages is hereunder described with reference to FIGS. 5 and 6 which show an internal illumination type switch device 5 that is chiefly composed of an outer case 101, a light source 102, a case in which the light source is accommodated, and a display panel 104. The outer case 101 is in the form of a box with its front open; the light source 102 is connected to an external circuit by a cord 106 which is drawn out of the case 101 through a hole 107 that is made in the center of its back side. The case 103 is fitted into the outer case 101 and is pivotally mounted on a pair of shafts 108 so that it can select either one of the two stop positions, ON and OFF. The display panel 104 is composed of light transmitting display portions 109 and 110 and light-shielding portions 111, so that a different color display is attained by 109 and 110 in accordance with the specific stop position selected by pivoting the case 103.

The light source 102 is covered with a filter 112 which is pigmented to have a certain color, say, green. The switch device 105 also contains strips 122 which are pigmented to have a color, e.g., blue, that is different from the color of the filter 112.

Figure 5:
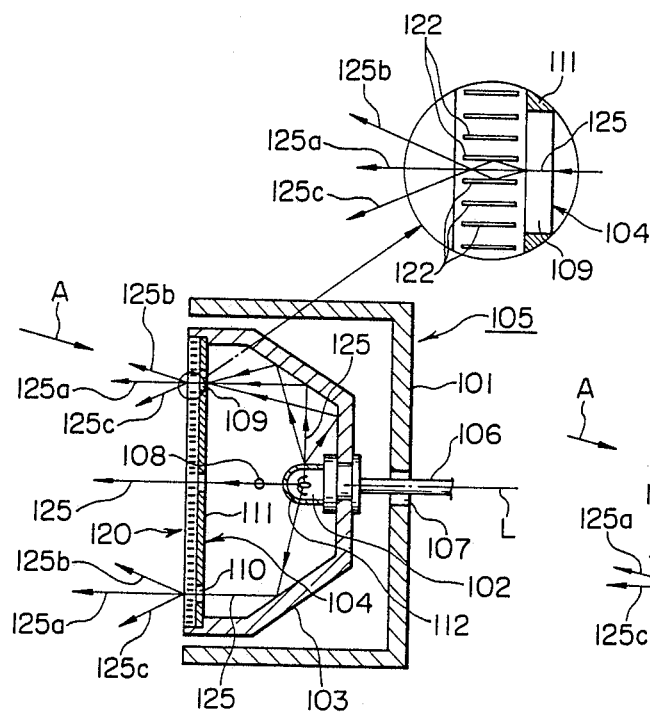
FIG. 5 shows in cross section the basic mechanical structure of an internal illumination type switch device in an OFF mode that incorporates the concept illustrated by FIGS. 2(a) and (b)

If the line of vision extending to the switch device 105 is inclined downward as indicated by arrow A in FIG. 5, the strips 122 which are horizontal in an OFF mode will intersect the line of vision A and the display portion 109 and 110 of the display panel 104 will display a blue color. The mechanism behind this phenomenon will be explained as follows: light issuing from the light source 102 is reflected by the inside wall of the case 103 to produce parallel rays of light 125 which are also parallel to the optical axis L; as they pass through the display portions 109 and 110, these parallel rays of light 125 undergo diffusion and refraction and part of the refracted light 125a will emerge from a color display controller 120 in a direction parallel to the optical axis L while the remainder of refracted light 125b and 125c will be reflected by the top surface of a strip 122 and the bottom surface of an overlying strip 122; since the component of light 125a makes no contact with the strips 122, it retains the original green color of illumination provided by the filter 112; however, the other components of light 125b and 125c are reflected by the strips 122 to produce a blue, rather than green, color of illumination. Therefore, as far as the line of vision A is concerned, the display portions 109 and 110 will display the blue color imparted by the component of light 125 whose travelling path is inclined upward. If the line of vision is shifted to the horizontal position, the component of light 125a will predominate to produce a green color of illumination.

Figure 6:
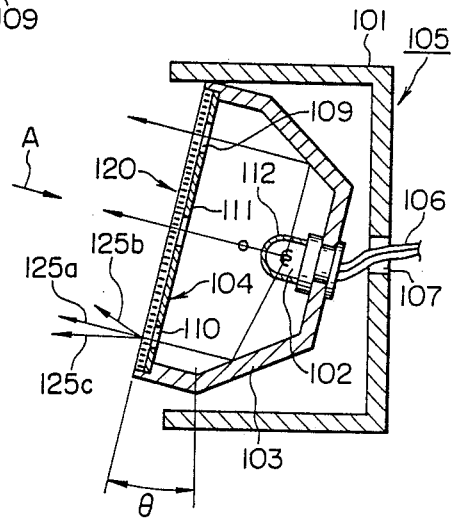
FIG. 6 is the same as FIG. 5 except that the switch device is in an ON mode.
Figure 10:
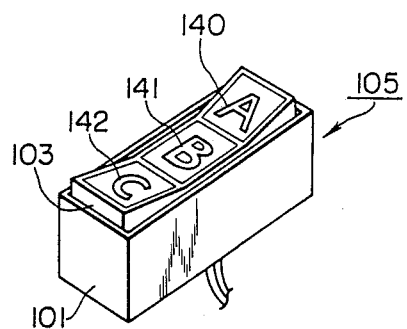
FIG. 10 is a perspective view of a display device according to a second embodiment of the present invention.

If the case 103 is depressed and pivoted clockwise, as seen from the side, to be brought into the ON position indicated in FIG. 6, the component of light 125a which is parallel to the strips 122 will come into registry with the line of vision A and the display portions 109 and 110 will display a green color which is the same as the original color imparted by the filter 112. If the line of vision is shifted to the horizontal posture, blue illumination is provided by the component of light 125c which has been reflected by the strips 122 to emerge from the color controller 120 in a substantially horizontal direction.

As described above, the illumination afforded by the display portions 109 and 110 will be changed from a green to blue color, or vice versa, when the switch device 105 is turned on and off, and this enables the driver to easily check whether the device is presently in an ON or OFF mode. In addition, the proportions of the quantities of light of components 125a, 125b and 125c that are transmitted through the color controller 120 can be adjusted by changing such factors as the distance between strips 122, their width, and the angle of pivoting of the case 103, and this allows the display portions 109 and 110 to provide illumination of an optimum brightness for either daytime or nighttime. As a further advantage, the entrance of ambient light 126 is blocked by the strips 122, with a resulting improvement in the contrast imparted to the internal display and, hence, in the visibility of the display attained when the light has lit up.

The exact conditions for allowing the display portions 109 and 110 to display different colors are determined by the angle $\theta$, at which the case 103 is inclined in ON or OFF mode, as well as by the distance (d) between strips 122 and their width (W). While several methods are available for increasing the quantity of light 125 that is transmitted through the color controller 120, one of them is to make the strips 122 from a light-transmitting material.

A first embodiment of the present invention in which it is applied to an internal illumination type switch device is hereinafter described with reference to FIG. 7. The device shown in FIG. 7 is in an OFF state. In FIG. 7, the components or parts which are the same as those shown in FIGS. 5 and 6 are identified by like numerals and will not be described in detail. The display panel 104 of the device shown in FIG. 7 is bent toward the front side along the center line to form a roughly V-shaped cross section. The front face of the display panel 104 is provided with the color display controller 120.

As specifically shown in FIG. 8, the color controller 120 is composed of a plurality of small parallel silicone rubber strips 122 that are vertically spaced from one another within the space defined by two transparent silicone rubber sheets 121 and which are pigmented to have a certain color that is different from the color provided by the light source 102. The strips 122 are fixed in position by two polycarbonate films 123 so as to provide a unitary louver structure. Light from the light source 102 is transmitted through one of the sheets 121 between individual strips 122 and emerges from the other sheet 121. Any ambient light 126 that is incident on the surfaces of the strips 122 at a large angle will be reflected back from the strips 122 to be kept outside the case 103.

The light source 102 is covered with a filter 112 which is pigmented to have a certain color, e.g., yellow. The color controller 120 has two display portions 109 and 110. The portion 109 is intended to display an ON state and the upper strips 122A which correspond to that portion are pigmented to have a blue color. The portion 110 serves to display an OFF state and the lower strips 122B corresponding to that portion are pigmented to have green color.

First suppose that the line of vision A is parallel to the optical axis of the switch device 105, with the case 103 being set for ON position. The display portion 109 is positioned upright to intersect the line of vision A at right angles whereas the display portion 110 is inclined toward the front side at angle $\theta$. Light 125 from the light source 102 assumes a yellow color as a result of passage through the filter 112. As it passes through the display portion 109 and the upper part of the color controller 120, the yellow light 125 undergoes diffusion and refraction to separate into a component 125a that passes straight between strips 122A and components 125b and 125c that are reflected from the top surface of a strip 122A and the bottom surface of an overlying strip 122A so as to emerge from the controller 120. Since the straight light component 125a is in registry with the line of vision A, the display portion 109 is illuminated with yellow light.

In the display portion 110, the component 125c of the yellow light 125 that has been reflected from the bottom surface of a strip 122B and which issues horizontally in a forward direction comes into registry with the line of vision A so as to impart green illumination to the display portion 110.

If the case 103 is pivoted counterclockwise by a predetermined angle to be brought to the OFF position indicated by the one-long and-one-short dashed line, the display portion 110 comes to the upright position and the display portion 109 becomes inclined toward the front side at a given angle. In this situation, the component 125c of light that has been reflected from the top surface of a strip 122A and which issues horizontally in a forward direction comes into registry with the line of vision A so as to impart blue illumination to the display portion 109. Since the display portion 110 is virtually upright and intersects the line of vision A at right angles, it is illuminated with the yellow component of light 125a that has passed straight between strips 122B.

As described above, the display portions 109 and 110 are illuminated with yellow and green light, respectively, when the switch device 105 is in an ON mode, and illuminated with blue and yellow light, respectively, when it is in an OFF mode. This enables the driver to easily check whether the switch device 105 is in an ON or OFF state. In addition, the proportions of the quantities of light components 125a, 125b and 125c that are transmitted through the color controller 120 can be adjusted by changing such factors as the distance between adjacent strips 122, their width, and the angle through which the case 103 is pivoted, and this allows the display portions 109 and 110 to provide illumination of an optimum brightness for either daytime or nighttime. As a further advantage, the entrance of ambient light 126 is blocked by the strips 122, with a resulting improvement in the contrast imparted to the internal display and, hence, in the visibility of the display attained when the light has lit up.

The exact conditions for allowing the display portions 109 and 110 to display different colors are determined by the angle $\theta$, at which the case 103 is inclined in ON or OFF mode, as well as by the distance, d, between adjacent strips 122 and their width, W. While several methods can be used to increase the quantity of light 125 that is transmitted through the color controller 120, one of them is to make the strips 122 from a light-transmitting sheet.

The display panel 104 of the device shown above is bent in a roughly V-shaped cross section and when it is in an ON mode, the display portion 109 meets the line of vision A at a right angle which has an optimum visibility that allows for easy reading of the display portion 109. In an OFF mode, the line of vision A intersects the display portion 110 orthogonally which, therefore, is at an angle that provides an optimum visibility and thereby allows for easy reading of the display portion 110.

FIG. 9 is a partial cross-sectional view showing the essential parts of a modification of the first embodiment of the present invention. In this modification, the front face of the display panel 104 is provided with a transparent resin sheet 113 and the color display controller 120 is provided on the back face of the panel. The other features of this modification are identical to those of the above-described first embodiment.

A second embodiment of the present invention is hereinafter described with reference to FIGS. 10 to 13. In this embodiment, three display portions 140, 141 and 142 are disposed side by side on the display panel 104 in its longitudinal direction in such a manner that they are selectively operated to effect displaying. Both ends of the display panel 104 which correspond to display portions 140 and 142 are bent toward the front side at an appropriate angle. Both surfaces of each of the strips 122A that correspond to the display portion 140 are pigmented to have a green color; the top surface of each of the strips 122B that correspond to the display portion 141 is pigmented to have a blue color and the bottom surface of each of said strips is pigmented to have an orange color; both surfaces of each strips 122C that correspond to the display portion 142 are pigmented to have a red color; and the filter 112 is pigmented to have a yellow color.

Figure 11:
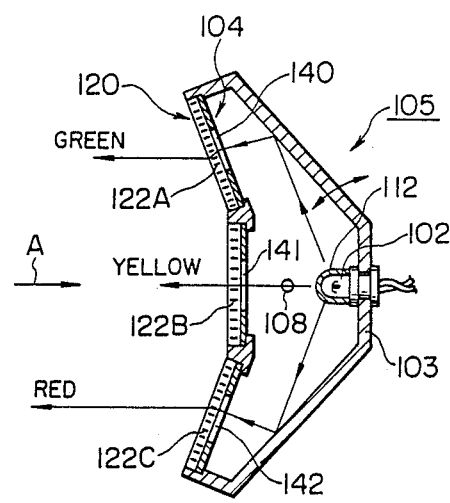
FIGS. 11 to 13 are cross-sectional views showing the display device of FIG. 10 in three different operating modes.
Figure 12:
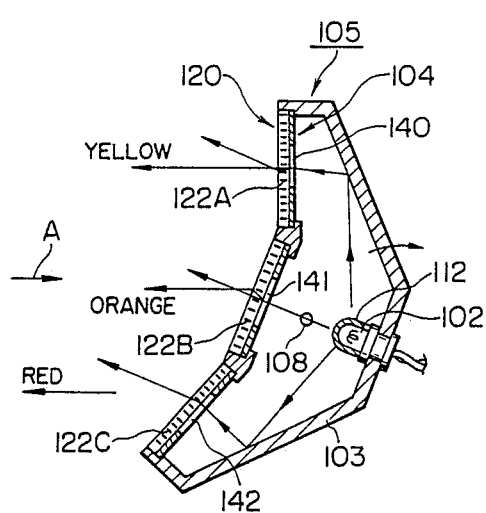
Figure 13:
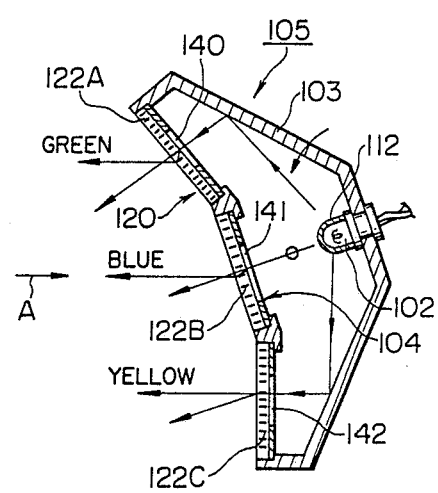

FIG. 11 shows the case where the display portion 141 is in a virtually upright position to become operational; FIG. 12 shows the case in which the display portion 140 is in a virtually upright position to become operational; and FIG. 13 shows the case where the display portion 142 is in a virtually upright position to become operational.

Suppose here that the switch device 105 is viewed from its front side in the horizontal direction indicated by arrow A. When the display portion 141 is in the operational state as shown in FIG. 11, the display portions 140, 141 and 142 are illuminated with green, yellow and red light, respectively; when the display portion 140 is in the operational state as shown in FIG. 12, the respective display portions are illuminated with yellow, orange and dark red light; and when the display portion 142 is in the operational state as shown in FIG. 13, the respective display portions are illuminated with dark blue, blue and yellow light.

In the embodiment shown, each of the strips 122A and 122C that correspond to th display portions 140 and 142 has the same color on both surfaces. Alternatively, the strips 122A and 122C may be disposed in such a manner that they are positioned parallel to the line of vision A when the display portion 141 is operational as shown in FIG. 11. If the top and bottom surfaces of each of the strips 122A (and strips 122C, too) are pigmented to have different colors, the colors displayed by the portons 140 and 142 will undergo the same changes as are produced by the display portion 141.

Figure 14:
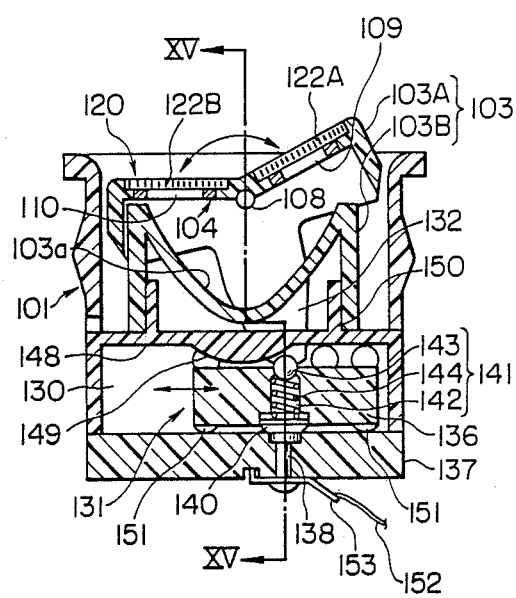
FIG. 14 is a cross-sectional view of a display device according to a third embodiment of the present invention.
Figure 15:
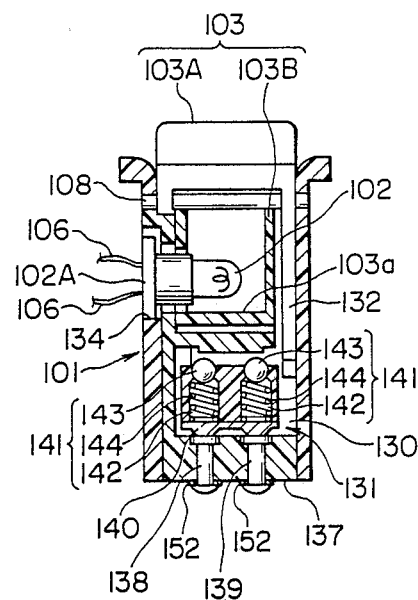
FIG. 15 shows a section of FIG. 14 as taken on line XIV—XIV.

FIG. 14 is a cross-sectional view of a display device according a third embodiment of the present invention. FIG. 15 is a section of FIG. 14 taken on line XIV—XIV. In this embodiment, a case 103 is composed of a pivotally mounted case body 103A with its front and rear sides open, and a reflector 103B that closes the rear open side of the case body 103A. A slide switch 131 for power-window is accommodated in a space 130 provided at the back of an outer case 101. The front open side of the case body 103A is provided with a display panel 104 that is bent toward the front side in a roughly V-shaped form as in the first embodiment and the surface of which is covered with a color display controller 120. The case body 103A has a manipulating arm 132 that projects as an integral part of the body from one lateral side thereof; this arm 132 extends backward along the inner surface of the outer case 101. The reflector 103B is fixed in the interior of the outer case 101 and its inner surface which faces the display panel 104 provides a parabolic reflecting plane 103a. A light source 102 is disposed at the focal point of this reflecting plane 103a. The light source 102 is inserted into a socket 102A that is securely fitted in a bulb mounting hole 134 made in one lateral surface of the outer case 101.

The slide switch 131 is basically composed of: a slider 136 that is moved by the manipulating arm 132 to slide in the space 130 from right to left, or vice versa (vis., in the horizontal direction in FIG. 14); a positive terminal 138 and a negative terminal 139 that are embedded in the rear cover 137 of the outer case 101, with the opposite ends of each terminal being exposed on the inner and outer surfaces of said rear cover 137; movable contacts 140 that are associated with the terminals 138 and 139 and which are provided on the back surface of the slider 136; and urging means 141 that is incorporated in the slider 136 for pressing it against the inner surface of the rear cover 137. The urging means 141 may be formed of a ball 143 that is movably received in a hole 142 in the slider 136 and which projects partly from the front face of the slider 136 with the necessary provision being made to prevent the ball 143 from slipping out of engagement with the latter, and a spring 144 that urges this ball 143 in the direction in which it projects. In the embodiment shown in FIGS. 14 and 15, two sets of urging means 141 are incorporated in the slider 136. In the center of the outer surface of the bottom plate 148 of the outer case 101, or the surface facing the rear cover 137, an arc-shaped projection 149 is formed as an integral part of the bottom plate. By allowing the balls 143 to cross over the projection 149, the slider 136 is switched from its OFF to ON position, or vice versa. On the ON position, the movable contact 140 is connected to both the positive terminal 138 and the negative terminal 139 so that a motor (not shown) for the power window is energized. On one side of the front surface of the slider 136 is provided a recess 150 into which the operating end of the manipulating arm 132 is inserted to have engagement therewith. The back surface of the slider 136 is provided at the four corners with hemispherical projections 151 that serve to reduce the friction with the rear cover 137. The numeral 152 denotes a cord, and 153 is a terminal wire.

As one can readily see, the display device having the construction described above is capable of attaining the same results as achieved by the first embodiment. In this third embodiment, the socket 102A for supporting the light source 102 is secured into the bulb mounting hole 134 in the outer case 101. Therefore, the case body 103A can be pivoted without imposing any tension on cords 106 connecting to the light source 102 and, as a result, the occurrence of open-circuit problems and any other troubles can be prevented.

In the embodiments described above, the color display controller 120 is provided on the front side of the display panel 104 but it should be understood that the controller 120 may be disposed on the back side of the display panel 104. It should also be noted that the strips 122A associated with the display portion 109 and the strips 122B associated with the display portion 110 may have the same, rather than different, colors.

The display device according to the foregoing embodiments of the present invention may be used as various types of automobile indicator lamps for displaying such information as the time when oil replacement should be done, the residual amount of such fluids as gasoline, oil and cleaner, or the temperature of the coolant in a radiator, oil and other fluids.

As described in the foregoing pages, the internal illumination type display device of the present invention allows its display portions to display different colors depending upon the angle by which the case of the device is pivoted and this enables the user to readily confirm the information indicated by the display even if he is in a dark environment. The display color controller has a very simple construction and yet provides for variations in the color of the display portions to give a sort of pleasure to the viewer. Therefore, the display device of the present invention can advantageously be incorporated in various kinds of switching devices and display devices. In addition, the display panel consisting of two display portions is bent in a roughly V-shaped form to have them inclined with respect to each other. When the case of the display device is pivoted, either one of the display portions is positioned at an angle that provides an optimum visibility with respect to the line of vision and thereby facilitates the reading of that particular display portion.

A fourth embodiment of the present invention is hereunder described with reference to FIGS. 16 and 17. Based on the concept illustrated in FIG. 2, this fourth embodiment aims at enhancing the three-dimensional effect of a projecting display portion and thereby providing novel and highly decorative illumination.

As in the previous embodiments, the color to be displayed by a display portion 214 is changed by a color controller 235 in accordance with a specific line of vision. This controller 235 is provided on the back side of a display panel 212 with a light shielding layer 220b provided therebetween. A light diffusing/transmitting layer 221 is provided on the back surface of the controller 235 in the area that corresponds to the display portion 214. Those areas of light-shielding layers 220a and 220b which correspond to the display portion 214 have been stripped away to permit light transmission.

The color controller 235 is composed of a plurality of small silicone rubber strips 237 that are horizontally spaced from one another within the space defined by two transparent silicone rubber sheets 236 and which are disposed parallel to the optical axis. The strips 237 that are pigmented to have a certain color that differs from the color provided by the light source are fixed in position by two polycarbonate films so as to provide a unitary louver structure. The strips 237 may be formed of a light-transmitting material.

Light issuing from the light source is guided by a guide plate (not shown) to enter the layer 121. The component of light 240a that issues from the layer 221 at a right angle to enter the controller 235 will not encounter any of the strips 237 and will go straight into the display panel 212, emerging from the diffusive surface 219 of the display portion 214. Therefore, the color of illumination provided by this light component 240a retains the color of light from the light source without having been affected in any way by the color of the strips 237. The components of light 240*b*, 240*c* and 240*d* that have been diffused by the layer 221 to change their direction will encounter the strips 237 to be either reflected by or transmitted through the strips. As a result, these components of light will emerge from the display panel 214 after their color has been changed to that of the strips 237. Therefore, the color of illumination provided by the light component 240*a* differs from that provided by the components 240*b*, 240*c* and 240*d*. For instance, if the light issuing from the light source and entering the layer 221 is white whereas the strips 237 are red, the light component 240*a* will be white while the components 240*b*, 240*c* and 240*d* will be red. As a consequence, the display device looks white if it is seen from the front and looks red if seen at an angle. If the line of vision is shifted from the front to either side, the color created by the display device will gradually change from white to red.

As a result of these effects, the displays device according to the fourth embodiment of the present invention will provide an enhanced three-dimensional effect compared with the illumination by light of a single color which is performed in the previous embodiments. This is a highly unique device that gives a sort of pleasure to the viewer in addition to achieving its intended function of display.

The strips 237 may be pigmented to have different colors on their front and back surfaces. For instance, if the front side 242 (see FIG. 17) of a strip is red and the back side 243 is blue, the color of final illumination can be changed from red to blue, or vice versa, by shifting the line of vision from the front to either side of the device. The mechanism behind this effect is described below: if the line of vision 245 is moved rightward in FIG. 17, the component of light that has been reflected from the front surface 242 of a strip 237 will encounter the viewer's eye which then recognizes it as red illumination; if the line of vision is moved leftward, the component of light that has been reflected from the back surface of a strip 237 will encounter the eye which recognizes it as blue illumination. If the line of vision 245 is not moved in either direction, the original color of illumination by the light source will be seen.

Another embodiment of the present invention that is intended to enhance the three-dimensional effect of a projecting display portion is hereunder described with reference to FIG. 18. In this fifth embodiment of the present invention, the top of the display portion 214 is finished to provide a smooth surface and part of this top surface is cut to form an oblique reflective face 250. Consider here the light that is transmitted straight through the diffusing/transmitting layer 221 and the color controller 235. Component 253 of this light that is directed toward the horizontal top surface 219 of the display portion 214 will be transmitted straight therethrough, retaining the original color of illumination provided by the light source. Light component 254 that goes straight to the reflective surface 250 is reflected by this surface and emerges from the display portion 214 at an angle. This component of light also retains the color of illumination afforded by the light source. Another light component 255 that has been reflected by strips 237 in the controller 235 to travel toward the reflective surface 250 has undergone a change in color from that of illumination afforded by the light source to that of the strips 237. This component 255 is refracted as it passes through the reflective surface 250 and thereafter emerges from the latter in a forward direction. As a result, the display portion 214, when seen from the front, will produce different colors in the top surface 219 and the reflective surface 250 and thereby providing a markedly enhanced three-dimensional effect for the display portion 214. In addition, the display device according to the embodiment shown above will produce a highly decorative effect.

In the fourth and fifth embodiments shown above, the strips 237 in the color controller 235 are placed side by side in the horizontal direction in such a manner that they are orthogonal to both front and back sides of the controller 235. It should, however, be noted that various modification may be made to the arrangement of strips 237 as shown in FIG. 19: (a) refers to the case where the strips are inclined at the same angle with respect to the surfaces of the controller; in (b), the strips are arranged to form a checkerboard pattern; and in (c), the strips are arranged to form a honeycomb configuration.

Figure 16:
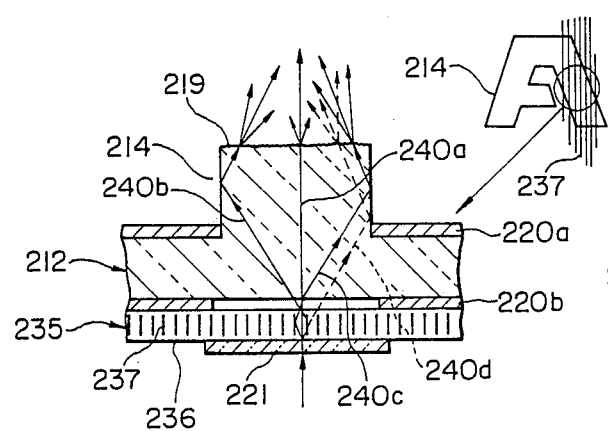
FIG. 16 is a partial cross-sectional view showing the essential parts of a display device according to a fourth embodiment of the present invention.
Figure 17:
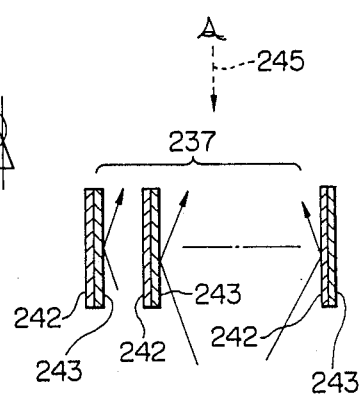
FIG. 17 shows a modification of the strips used in the device of FIG. 16.

The display devices shown in FIGS. 16 and 18 may be used with a display panel of the type shown in FIG. 20 and assembled into an optical apparatus having the construction shown in FIG. 21. The display device 210 shown in FIG. 21 is basically composed of a case 211 in a tray form with its top open, a display panel 212 that covers the open top of the case 211, a light source 213 disposed in the case 211, a guide plate 215 by which light issuing from the light source 213 is guided to the display portion 214 of the display panel 212, and a light-shielding cover 216 that partly covers the surface of the display panel 212.

The display panel 212 is formed of a flat plate of a transparent or light-transmitting material such as an acrylic resin and has a sign, e.g., the letter "A" in the center of its surface that stands out as the display portion 214 which is an integral part of the panel. The light-shielding cover 216 has openings 218 through which the necessary parts of the display portion 214 project from the front surface of the cover. The projecting surface of the display portion 214 serves as an embossed light-diffusing surface 219 having small recesses and projections. The diffusing surface 219 may be formed during fabrication of the display panel 212 or it may be formed thereafter by sand-blasting, coating of a frosted transparent paint, or by printing. The front side of the display panel 212 is covered with a light-shielding layer 220 except in the area where the display portion 214 is provided but the layer 220 may be omitted if the display panel 212 is partly covered with the light-shielding cover 216. The back side of the display panel 212 is provided with a light diffusing/transmitting layer 221 in the area that corresponds to the display portion 214. The layer 221 has the same planar shape as the display portion 214 and is formed of such a material as a transparent sheet, plate or paint that contains diffusive particles in its interior.

The guide plate 215 is made of a highly light-transmitting resin material such as an acrylic resin. The area of the underside of this plate that corresponds to the display portion 214 is provided with a number of conical recesses 222 by which the light from the light source 213 is reflected upward.

The light-shielding cover 216 in which the display panel 212 is accommodated is secured to the top surface of the case 211 by fastening their marginal portions with screws 223. In this way, the shielding cover 216 serves not only as a fastener for securing the display panel 212 to the case 211 but also as a shade that prevents the occurrence of light leakage from the lateral sides of the display panel 212.

The display device shown in FIGS. 20 and 21 achieves unique illumination that produces enhanced three-dimensional effects and, at the same time, it fully meets the demand of consumers for having diversity in the design of display devices.

In this display device, light that is transmitted through the display panel 212 to emerge from the display portion 214 passes through the following states: first, it illuminates the layer 221 as it is diffused through this layer; the light is then transmitted through the display portion 214 and illuminates the diffusive layer 219 as it is diffused through the latter. In other words, the letter "A" formed by the transmitting layer 221 and the same letter "A" formed by the diffusive layer 219 are not illuminated simultaneously, and when the display device is seen at an angle with respect to its front, the letter formed by the layer 221 acts as the shadow of the letter formed by the overlying layer 219. This effect, combined with the height of the display portion 214, allows the letter "A" to be seen as a sign having a highly enhanced three-dimensional effect.

As described above, each of the display devices according to the fourth and fifth embodiments of the present invention has a display portion that projects from the front face of the display panel which is also provided with a light diffusing/transmitting portion in its back side in the area that corresponds to the display portion. Because of the "dual" illumination provided by the transmitting and display portions, the display devices of these two embodiments will produce a display having an enhanced three-dimensional effect. These display devices are unique both from decorative and design viewpoints and will fully meet the demand of consumers for diversity in the design of display devices.

Three additional embodiments of the present invention are hereunder described with reference to FIGS. 22 to 24. In these embodiments, a louver sheet 312 composed of a plurality of thin strips 314 that are spaced parallel to each other is provided to follow the curvature of a front lens 304 in a generally semi-cylindrical form in such a manner that the amount of light transmission is controlled by the strips in the louver sheet.

Figure 22:
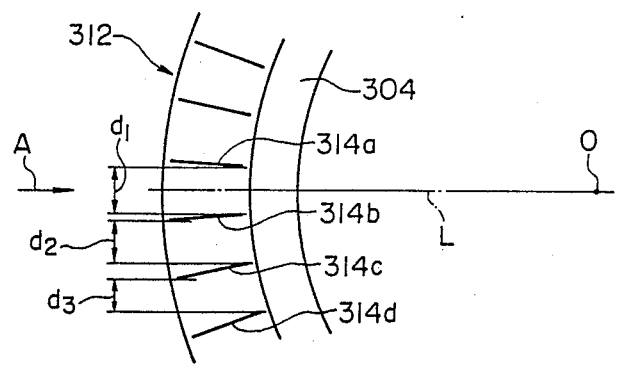
FIG. 22 shows the arrangement of strips used in a display device according to a sixth embodiment of the present invention.

A sixth embodiment of the present invention is shown in FIG. 22. If the louver sheet is looked at with the line of vision directed to its center (in the direction of arrow A), two adjacent strips 314a and 314b between which the optical axis L of the front lens 324 is situated are seen generally parallel to the optical axis L and the distance, $d_1$, between these two strips as seen in the direction arrow A has a maximum value. As they depart farther away from the optical axis L, the angle of inclination of the other strips (314c, 314d, ...) increases, and the distance between these strips as seen in the direction of arrow A will decrease correspondingly ($d_1 > d_2 > d_3$ ...).

In other words, the amount of light transmission in the direction of the line of vision (direction of arrow A) is the largest in the center, or top surface, of the front lens 304 and decreases gradually as the line of vision moves either upward or downward. This phenomenon may be called the "gradation effect". When the louver sheet 312 is seen from the front, the light emerging from the sheet looks like an array of straight horizontal lines because it has been partitioned by the strips 314.

The center of curvature of louver sheet 312 coincides with the center O of the front lens 304 and the extension of the plane of each of the strips 314a, 314b, 314c, ... passes through this center O. As a result, the light transmittance through the louver sheet 312 changes continuously in the peripheral direction of the lens 304.

Figure 23:
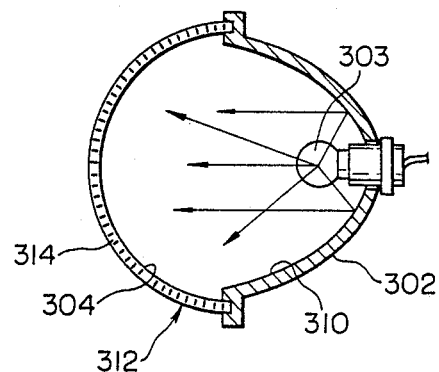
FIG. 23 is a cross-sectional view of a display device according to a seventh embodiment of the present invention.

FIG. 23 is a cross-sectional view of a display device according to a seventh embodiment of the present invention. In this embodiment, the louver sheet 312 is integrated in the front lens 304 to form a unitary assembly. The strips 314 in the louver sheet 312 are translucent (semi transparent) and admit a certain amount of light transmission. This embodiment has the advantage of producing the desired "gradation" effect in an efficient manner even if the front lens 304 has a small curvature.

Figure 24:
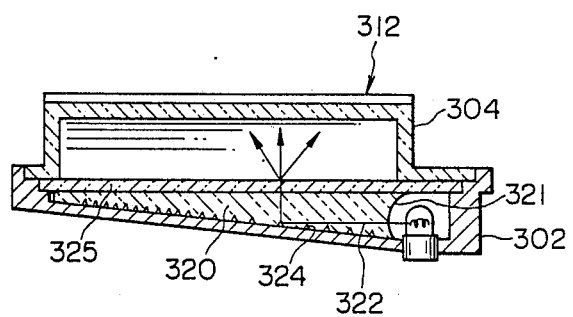
FIG. 24 is a cross-sectional view of a display device according to an eighth embodiment of the present invention.

FIG. 24 is a cross-sectional view of a display device according to an eighth embodiment of the present invention. In this embodiment, light from a light source 303 is permitted to enter a guide plate 320 through a light-admitting portion 321 at one end thereof, and the incident light 322 is reflected toward the front side by a number of small V-shaped recesses formed in the underside of the guide plate 320, and the light emerging from the top surface of the guide plate 320 is diffused through a diffusive plate 325 to produce illumination for the front lens 304 lying under the louver sheet 312. These components are supported in a lighting body 302 which is in the form of a tray with an inclined bottom. The guide plate 320 is wedge-shaped in order to minimize the loss of light.

In the three embodiments described above, the strips 314 in the louver sheet 312 are colorless. It should, however, be noted that these strips may be pigmented to have a chromatic color, e.g., red, so as to produce the gradation of not only brightness (change in the quantity of light transmission) but also of color hue (change in color).

As described above, in the display devices according to the sixth to eighth embodiments of the present invention, a louver sheet composed of a plurality of strips that are spaced parallel to each other is provided to follow the curvature of a front lens in a generally semi-cylindrical shape. Although this is simple in construction, it is able to produce a continuous change in brightness or the color of illumination over the surface of the front lens as the line of vision moves from the center of the lens to either side in its peripheral direction.

What is claimed is:

1. A display device which comprises a case in which a light source is accommodated, color changing means by which the color of light from the light source is changed to a predetermined color of illumination, a display panel that is formed of a light-transmitting material to cover a front opening of said case facing said light source and which is provided with a light-shielding film in areas other than those corresponding to a display portion, and a color display controller that is disposed on said display panel and which controls the color of illuminating light that issues from said light source and is transmitted through the display portion, said color display controller being composed of a plurality of thin strips that have a color different from that of illumination provided by said color changing means and which are spaced from each other, said light source being disposed behind said strips, with the color provided by said color changing means being displayed when the light issuing from said light source has passed between said strips while a composite of the color provided by said color changing means and the color of said strips being displayed when the light issuing from said light source has been reflected from said strips.

2. A display device according to claim 1 wherein said case is pivotally mounted and the color displayed varies with the angle by which said case is pivoted.

3. A display device according to claim 1 wherein said plurality of strips are arranged parallel to each other and at a right angle to said display panel.

4. A display device according to claim 2 wherein a plurality of said display portions are arranged at a predetermined angle with respect to each other and said color controllers respectively associated with said display portions are arranged at a similarly predetermined angle to each other.

5. A display device according to claim 2 wherein said display panel is bent in its center to form a roughly V-shaped cross section.

6. A display device according to claim 1 wherein said plurality of strips are arranged parallel to each other and inclined to said display panel.

7. A display device according to claim 1 wherein said display panel has a front and a back surface, and said color controller is provided on one of the front surface and the back surface of said display panel.

8. A display device according to claim 1 wherein said display portion projects from a front surface of said display panel and a light diffusing/transmitting layer is provided on the area of said color controller which corresponds to said display portion.

9. An internal illumination type display device which comprises a case that is pivotally mounted and adapted to select at least two stop positions, a display panel that has a light-transmitting display portion and a light-shielding portion and which is disposed in a front opening of said case, a light source that is disposed within said case and facing said opening and which illuminates said display portion with light of a predetermined color, and a color display controller composed of a plurality of thin strips that are spaced parallel to each other and are pigmented to have a color that differs from the color of illumination afforded by said light source, said controller being disposed on one of a front surface and a back surface of said display panel so as to allow the display portion to produce a different color in accordance with the specific stop position selected by pivoting said case.

10. An internal illumination type display device which comprises a case that is pivotally mounted and adapted to select at least two stop positions, a display panel that has a light-transmitting display portion and a light-shielding portion and which is disposed in a front opening of said case, a light source that is disposed within said case facing said opening and which illuminates said display portion with light of a predetermined color, and a color display controller that is composed of a plurality of thin strips that are spaced parallel to each other and which are pigmented to have a color that differs from the color of illumination afforded by said light source, said controller being disposed along either the front or back surface of said display panel so as to allow the display portion to produce a different color in accordance with the specific stop position selected by pivoting said case, said display panel being bent in its center to form a roughly V-shaped cross section.

11. An illuminator which comprises a light source, a lighting body for accommodating said light source, a front lens in a generally semi-cylindrical form which is disposed in a front opening of said lighting body facing said light source, a louver sheet that is composed of a plurality of thin strips spaced parallel to each other and which is disposed to follow the curvature of said front lens in such a manner that the amount of light transmission in the direction of the line of vision is controlled by said strips, wherein said strips are spaced at respective distances to create a gradation in brightness, and said strips have a chromatic color to create a gradation of color hue.

12. In a display device in which a display portion of a display panel is illuminated from a back surface of said display panel, the improvement wherein at least a part of said display portion projects from a front surface of said display panel, said part of said display portion which projects from said front surface having an overlying layer, said projecting part and said overlying layer having a planar shape in the form of a letter or any other symbol, for diffusing light, a light diffusing/transmitting layer disposed between said display panel and said back surface and having a shape which is the same as that of said overlying layer and is disposed in alignment with said overlying layer, and means for illuminating said light diffusing/transmitting layer so as to illuminate said overlying layer due to the alignment therewith.

* * * * *